No. 742,215. PATENTED OCT. 27, 1903.
E. NICHOLSON.
SHIP'S LOG.
APPLICATION FILED APR. 2, 1900.
NO MODEL. 6 SHEETS—SHEET 1.

WITNESSES: INVENTOR:
Ezra Nicholson.
BY
ATTORNEY

No. 742,215. PATENTED OCT. 27, 1903.
E. NICHOLSON.
SHIP'S LOG.
APPLICATION FILED APR. 2, 1900.
NO MODEL. 6 SHEETS—SHEET 2.

WITNESSES: INVENTOR
Ezra Nicholson.
BY
ATTORNEY

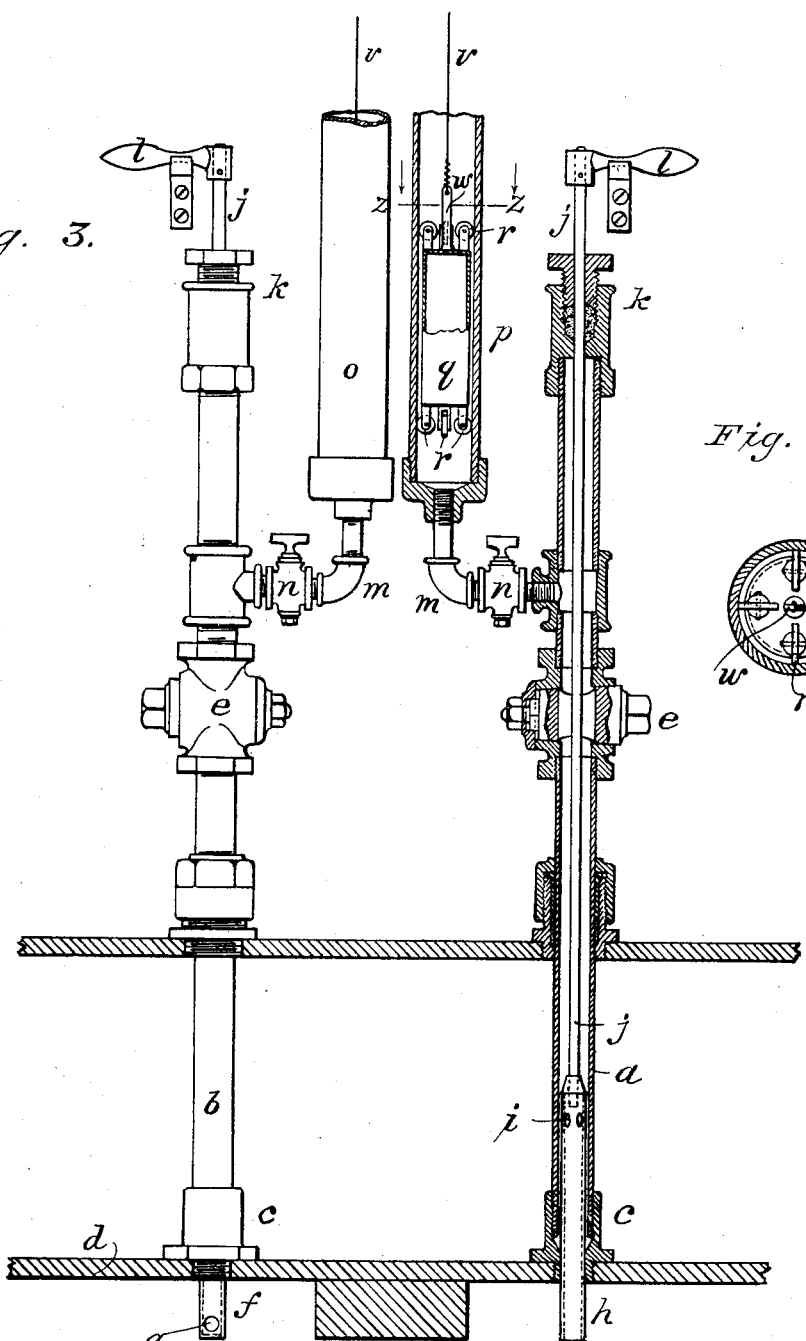
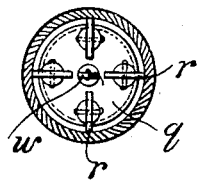

No. 742,215. PATENTED OCT. 27, 1903.
E. NICHOLSON.
SHIP'S LOG.
APPLICATION FILED APR. 2, 1900.
NO MODEL. 6 SHEETS—SHEET 4.

WITNESSES:
Wm A. Skinkle
C. D. Henderson.

INVENTOR
Ezra Nicholson.
BY
Am Austin
ATTORNEY

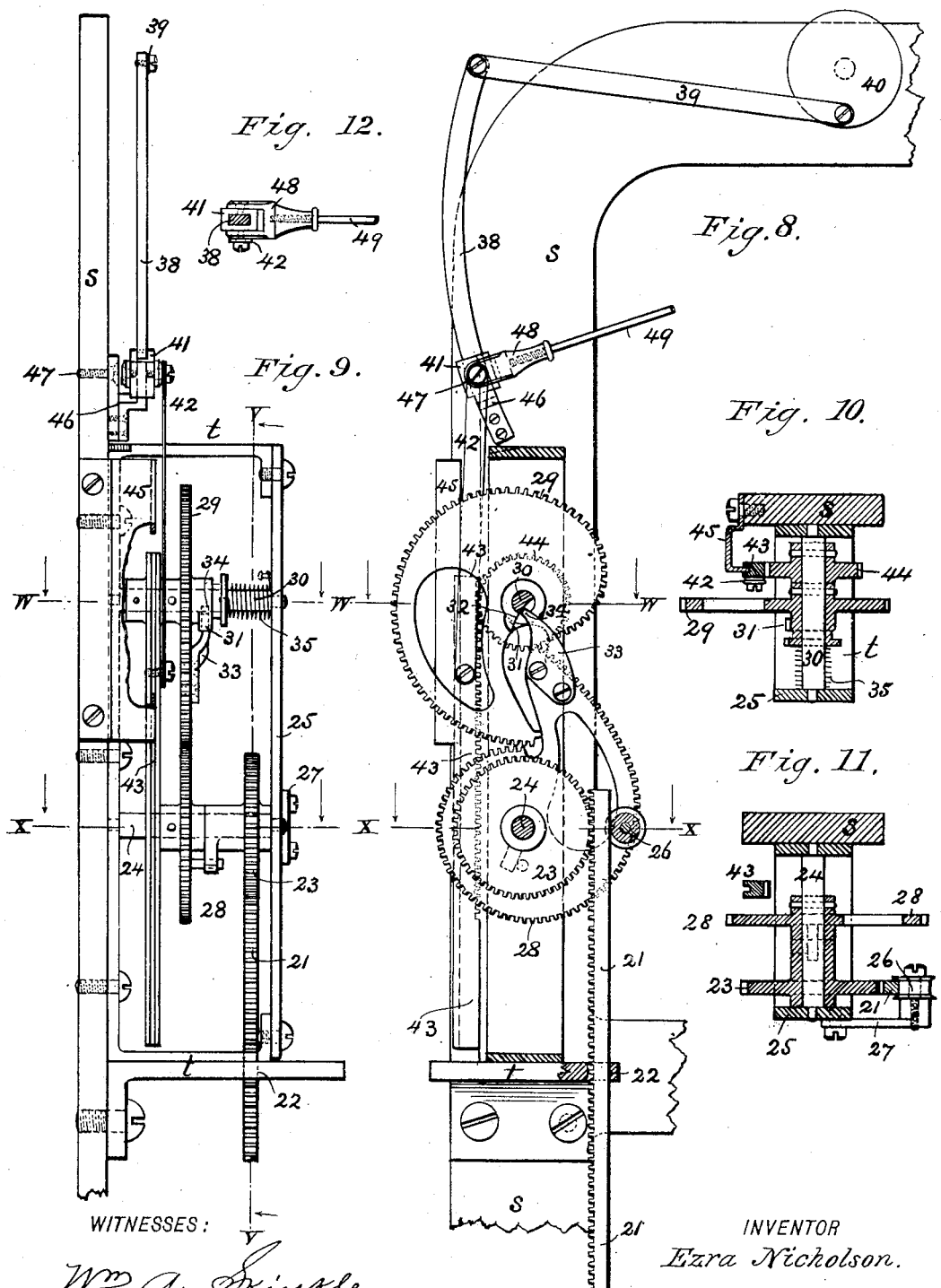

No. 742,215. PATENTED OCT. 27, 1903.
E. NICHOLSON.
SHIP'S LOG.
APPLICATION FILED APR. 2, 1900.
NO MODEL. 6 SHEETS—SHEET 6.
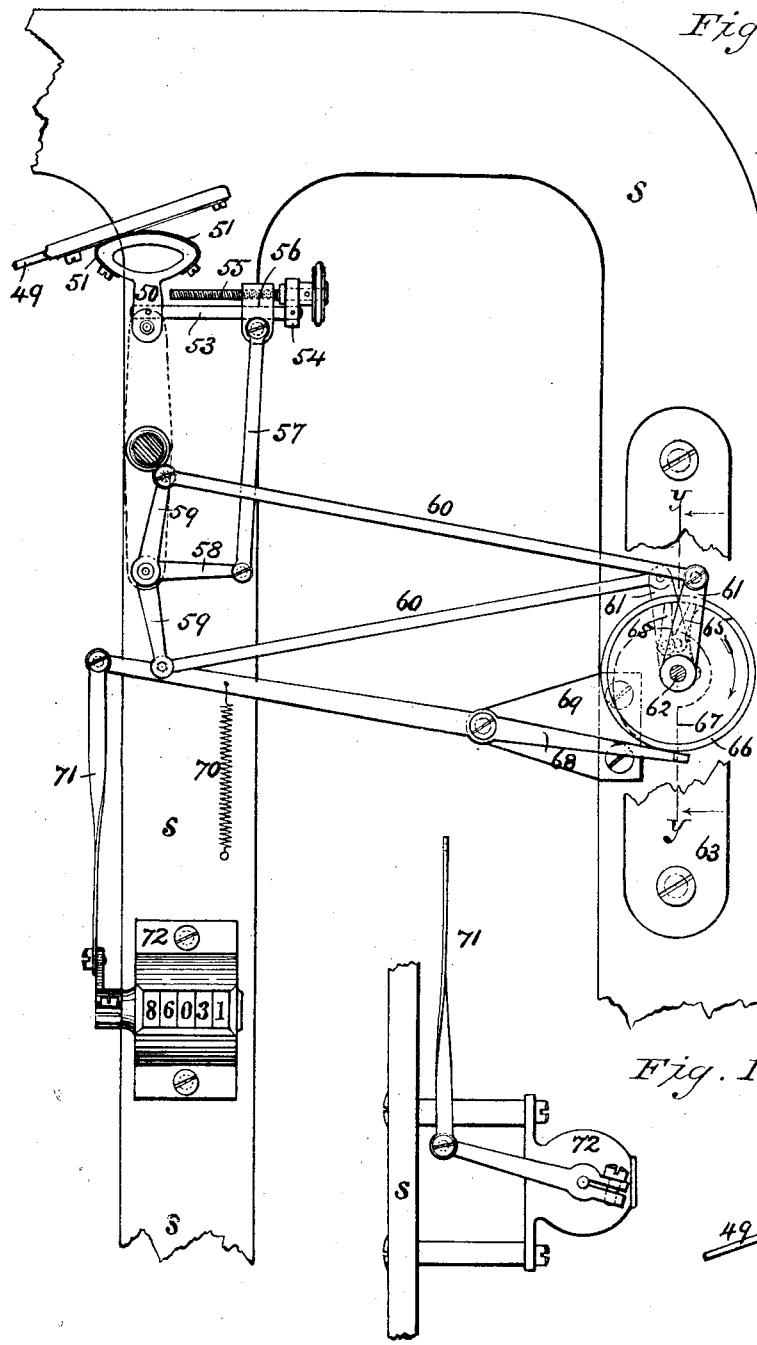
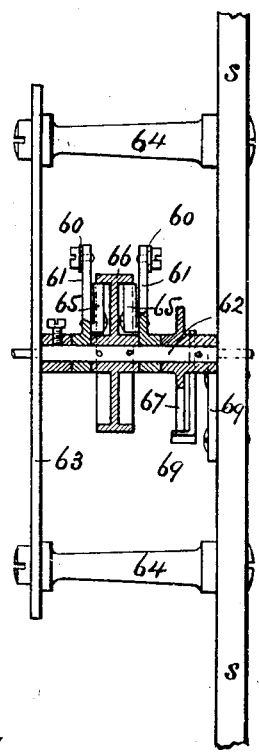
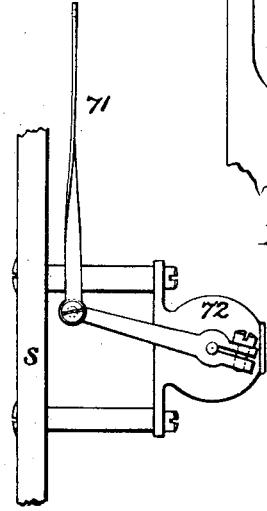
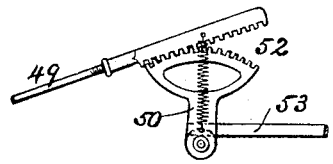
WITNESSES:
Wm. A. Skinkle
C. A. Henderson
INVENTOR
Ezra Nicholson.
BY
Aur Austin
ATTORNEY No. 742,215. Patented October 27, 1903.

UNITED STATES PATENT OFFICE.

EZRA NICHOLSON, OF LAKEWOOD, OHIO.

SHIP'S LOG.

SPECIFICATION forming part of Letters Patent No. 742,215, dated October 27, 1903.

Application filed April 2, 1900. Serial No. 11,154. (No model.)

*To all whom it may concern:*

Be it known that I, EZRA NICHOLSON, a citizen of the United States of America, residing at Lakewood, Cuyahoga county, Ohio, have invented certain new and useful Improvements in Ships' Logs, of which the following is a specification.

The annexed drawings and the following description set forth in detail one mechanical form embodying the invention, such detailed construction being but one of various mechanical forms in which the principle of the invention may be used.

Figure 1:
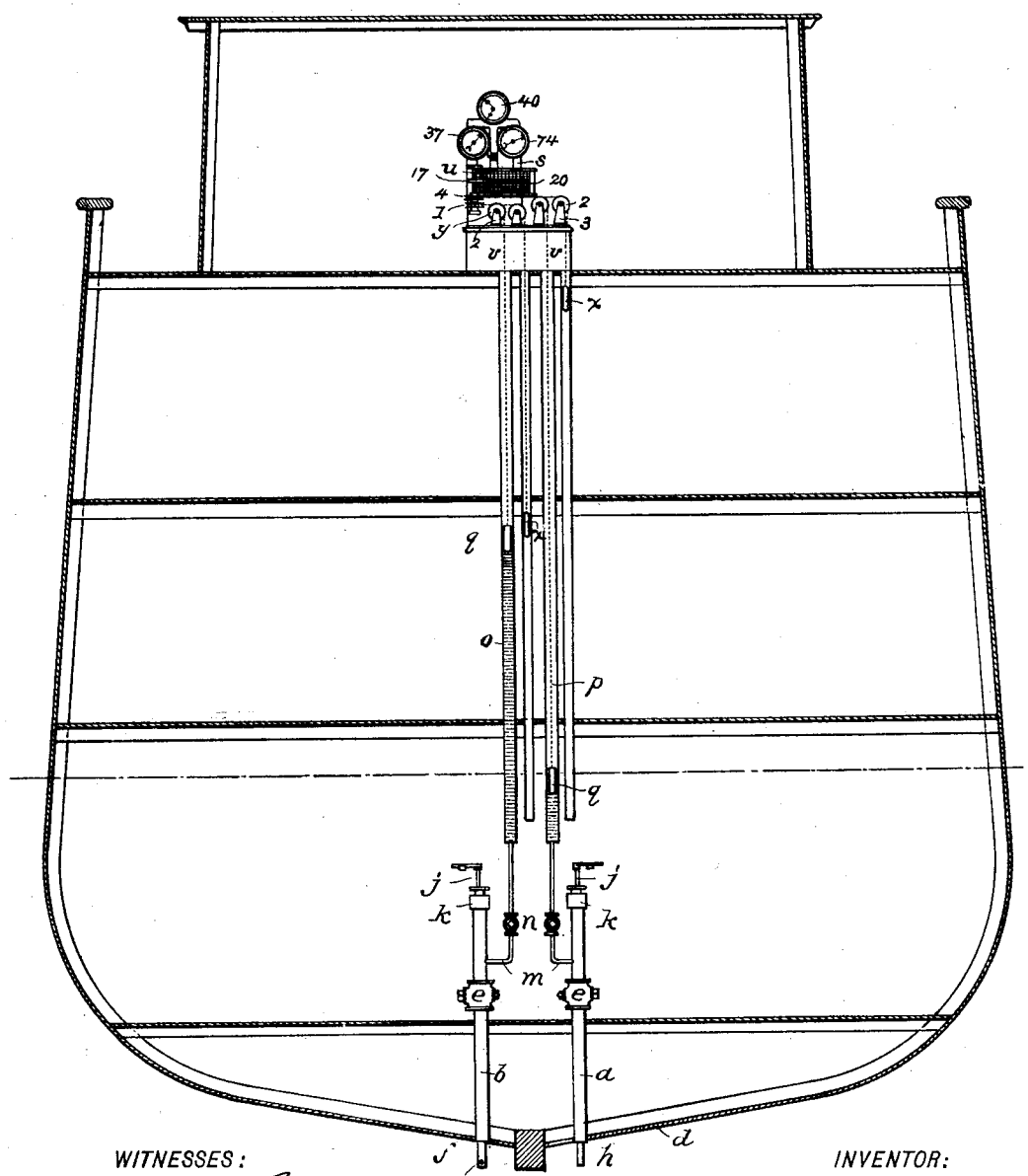
Figure 2:
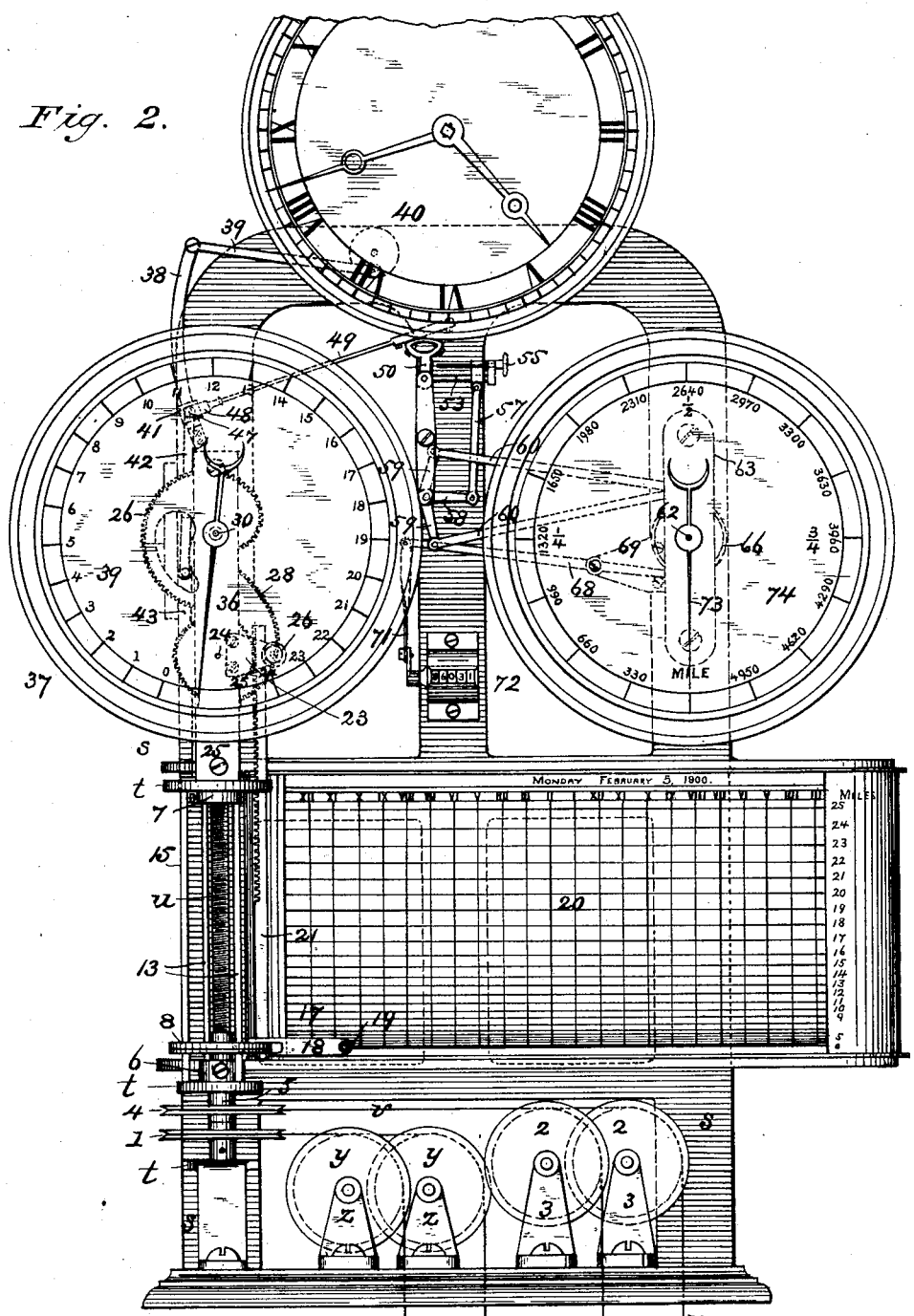
Figure 6:
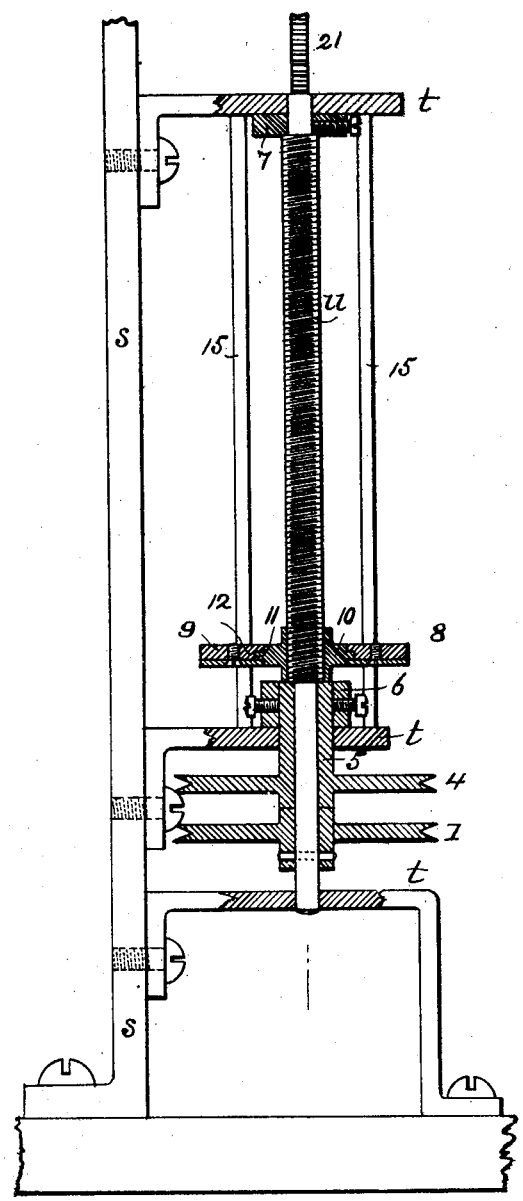
Figure 5:
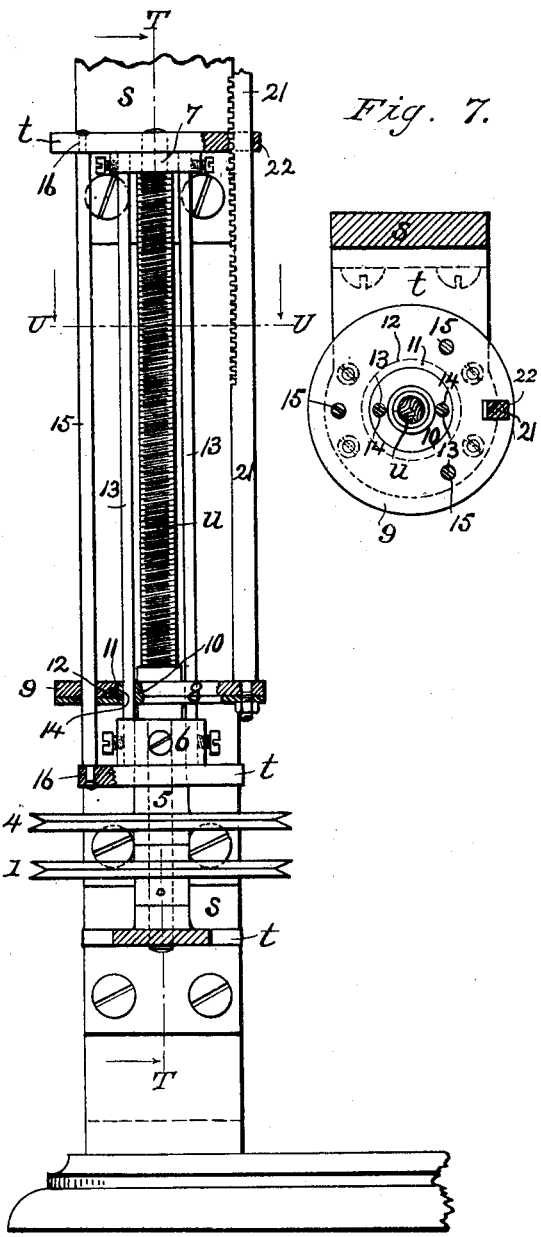
Figure 7:
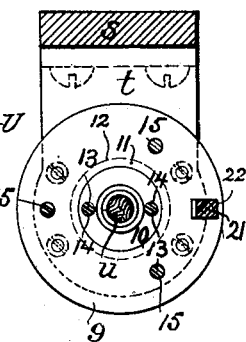

In said drawings, Figure 1 is a diagrammatic view of a vessel provided with my improved ship's log. Fig. 2 is a front elevation of a portion of the log, showing the speed indicating and recording mechanism. Fig. 3 is an enlarged detail view, partly in section, of the water-pipes, showing the floats therein. Fig. 4 represents a section on the line Z Z of Fig. 3, showing a plan view of a float. Fig. 5 represents a front elevation of the feed-screw and disk. Fig. 6 represents an elevation in section of said screw and disk on the line T T of Fig. 5. Fig. 7 represents a longitudinal section of the same on the line U U of Fig. 5. Fig. 8 is an enlarged detail view of the compensating gears, showing the actuating-racks and a portion of the distance-indicating mechanism. Fig. 9 represents a side elevation of the compensating gears. Figs. 10 and 11 are sectional views on the lines W W and X X, respectively, of Figs. 8 and 9. Fig. 12 is a detail view showing the attachment of the distance-recording mechanism of the rocking arm. Fig. 13 is a front elevation of the distance indicating and recording mechanism. Fig. 14 is a side elevation of the same in section in the line Y Y of Fig. 13. Fig. 15 is a detail view showing the distance-recorder and means for actuating same. Fig. 16 represents a front elevation of another form of engagement between the connecting-rod and the distance-indicating mechanism.

In my improved log the speed-indicating mechanism is controlled by two columns of water admitted into the vessel by means of permanent receiving-pipes $a$ and $b$, that pass through suitable stuffing-boxes $c$ and thence through the bottom $d$ of the vessel. Each pipe is provided with a stop-cock $e$, having an opening sufficiently large to permit the passage of an intake-tube. One of said tubes, $f$, is closed at its lower end and is provided with an opening $g$ in its side toward the bow of the vessel, so that the column of water admitted by said tube will be subjected to the pressure due to the progress of the vessel. The other tube, $h$, is open at its end, so that the column of water admitted thereby will not be affected except by a change in the draft of the vessel. Said tubes are turned and fitted water-tight at the bottom of the pipes and are provided with perforation $i$ near their tops. A stem $j$ is secured to each tube, that extends through a stuffing-box $k$ in the upper end of each pipe and is provided with a handle $l$, whereby the tube may be raised above the stop-cock. Preferably connected with each of the receiving-pipes at a point below the light-load water-line of the vessel is a stand-pipe that communicates with the receiving-pipe through a passage $m$, that is provided with a stop-cock $n$. The speed stand-pipe $o$, communicating with the speed-tube, is necessarily of sufficient height to accommodate the column of water that may be raised by the speed of the vessel, while the level stand-pipe $p$, which communicates with the level tube $h$, is necessarily only high enough to provide for changes in the draft of the vessel. Within each stand-pipe is a float $q$, that is provided at its top and bottom with antifriction-rollers $r$ to hold same out of contact with the sides of the pipe.

The speed and distance indicating and recording mechanism is supported by a frame $s$, provided with brackets $t$, that may be placed in any convenient location, preferably above the stand-pipes. Said mechanism is provided with a shaft $u$, journaled in the brackets, that is actuated from the floats by means of wires $v$, which are secured at one end to the lugs $w$ on the floats and at the other end to counterweights $x$. The wire attached to the float in the speed-pipe passes over pulleys $y$, rotatable upon lugs $z$, secured to the frame, and operatively engages a wheel 1, keyed upon the shaft. The wire attached to the float in the level pipe passes over corresponding pulleys 2 upon lugs 3, secured to the frame, and engages a wheel 4, formed integral with a sleeve 5, that is loosely journaled upon the lower part of the shaft. A collar 6 is rigidly secured to the top of the sleeve, and a corresponding collar 7 is journaled near the top of the shaft, which is screw-threaded between said collars. A movable disk 8 is mounted on the shaft, that consists of a ring 9 and a flanged nut 10, provided with a tongue 11, engaging in a groove 12 in the ring. Said nut is tapped to engage the thread on the shaft and can be rotated by means of rods 13, secured in the collars, that pass through perforations 14, formed in the flange, which permit movement lengthwise of the shaft. The ring is held against rotation, but is movable upon rods 15, secured in the brackets, that pass through perforations 16, formed therein. A marker 17 is secured to the disk, that consists of an arm 18, provided with a pencil 19, adapted to engage with and trace a speed-line upon a chart 20, which may be made to revolve beneath the pencil in any well-known manner. Also secured to the disk is a rack 21, that projects upward through an opening 22 in the brackets and engages with a pinion 23, keyed to a shaft 24, journaled in the frame and in a plate 25, secured to the brackets. Said rack is held in engagement with the pinion by means of a guide-roller 26, supported by a bracket-arm 27. The pinion is rigidly secured to or formed integral with the spiral 28, that is also keyed upon the shaft and forms a part of the compensating gear. The other spiral, 29, forming said compensating gear, is keyed upon a shaft 30, journaled in the plate and frame above said spiral 28. The hub of the upper spiral is provided with a lug or projection 31, having an irregular bearing-surface 32. A starter 33 is secured to the lower spiral, preferably bent at an angle thereto and provided with a rounded end 34, that engages with the bearing-face of said projections and rotates the upper spiral until said spirals mesh directly with each other. A torsional spring 35 holds the spirals in mesh with each other and prevents backlash. A pointer 36 is secured to the upper shaft and indicates the amount of rotation of said shaft, in units or miles, upon a dial 37, that is secured to the frame.

Pivoted above the spiral is an arm 38, that is connected by a link 39 with a clock 40 and is rocked thereby. A slide-block 41 is adjustable upon the arm by means of a link 42, pivoted to a rack 43, that is actuated by a pinion 44, keyed upon shaft 30, and is held in engagement therewith by means of a flanged plate 45. Said arm is preferably curved in outline and is recessed, 46, so as to permit the slide-block to come directly opposite its pivotal point 47. The slide-block is provided with a pivoted link-head 48, secured to one end of a connecting-rod 49, which operatively engages a segment-lever 50 by means of straps 51 or gear-teeth 52. The free arm 53 of said lever is provided with an enlargement or head 54, that provides a seat for an adjusting-screw 55, engaging with a movable shoe 56 upon said arm. A link 57, secured to the shoe, connects said segment-lever with a horizontal arm 58 of a three-part lever provided with the upwardly and downwardly projecting arms 59. Each of said arms is connected by a link 60 with levers 61, loosely mounted upon a shaft 62, journaled in the frame and in a plate 63, that is supported by standards 64. Said levers are each provided with a dog 65, that engages with the flanged rim of a wheel 66, keyed upon the shaft between the levers, and imparts a rotary movement thereto. A cam 67 is also keyed upon the shaft and engages the end of the lever 68, that is pivoted to a plate 69 upon the frame and is held in contact with the cam by means of the spring 70. Said lever is connected by a link 71 with a permanent distance-recorder 72, secured to the frame so that the recorder is actuated at each revolution of the cam. Upon the outer ends of the shaft 62 is a pointer 73, which measures the rotation of the shaft in fractional parts of miles or knots upon a disk 74, that is secured to and supported by the frame.

To operate my improved log, water is admitted into the stand-pipes, and as long as the vessel remains at rest the water rises to the height of the water-level of the vessel in both of the pipes. When the vessel begins to move, however, and thereby produces pressure in the stand-pipe communicating with the intake-tube, which has an opening in its side toward the bow of the vessel, the water rises in said speed-pipe at a ratio which is approximately as the square of the speed. The rise of the water elevates the float contained in the pipe, and thereby actuates the screw which feeds the disk upward, and it operates the compensating gear by means of the rack attached thereto. Changes in the draft of the vessel by reason of loading or unloading cargo or from other causes do not affect the position of the disk, since when the height of the water in the level-pipe changes the column of water in the speed-pipe correspondingly changes, and both the feed-screw and the flanged nut are rotated independently of each other at the same speed and in the same direction. Thus the disk is always at the bottom of the feed-screw when the vessel is at rest, regardless of the draft of the vessel, and is raised on the feed-screw only when the vessel moves so as to cause the height of the water-column in the speed-pipe to change relatively to the water-level of the vessel. As the rise of the water in the speed-column is relatively small when the vessel moves at a rate of speed less than three or four miles per hour, it is desirable to use a starter in connection with the compensating gear, as a comparatively small movement of the lower spiral thereby rotates the upper spiral the proper distance and the construction of the spirals is much simplified. The spirals are so constructed that the upper spiral moves the same distance or through the same arc for each corresponding increase in the speed of the vessel, regardless of the irregular changes of the water column and disk for corresponding increases in the speed of the vessel. As the upper spiral is rotated the same distance for each corresponding increase in speed, the slide-block upon the rocking arm is also moved by the rack the same distance for each corresponding increase in the speed. The construction of the arm permits the connecting-rod to come directly opposite its pivotal point, so that the arm can be rocked continuously by the clock without imparting motion to the distance-indicating mechanism, except when the water column in the speed-pipe changes in relation to the water-level of the vessel. As the arm is rocked regularly by the clock, therefore, the motion imparted to the distance indicating and recording mechanism varies according to the position of the connecting-rod upon the arm. The segment-lever causes the connecting-rod the same throw of said lever, regardless of the angle of the connecting-rod. The adjusting-screw provides means for adjusting the lever accurately.

Since the water in the pipes is apt to fluctuate, owing to the rolling of the vessel and other causes, a stop-cock is provided between the receiving-pipes and the stand-pipes, whereby the opening between said pipes can be regulated so as to prevent the rapid fluctuations that would otherwise occur and keep the level of the column of water in the level stand-pipes approximately true with the water-level of the vessel. By means of this construction I am enabled to combine a speed-indicator and a distance indicator and recorder in one instrument that may be placed in a vessel that is most convenient, and which automatically indicates and records the speed and the distance traveled. The log also automatically provides for changes in the draft in the vessel, which will vary considerably during a long voyage. It is adapted to be used on vessels propelled either by steam or by sails, as it can be easily constructed to record the highest speed obtainable by a vessel of any class. Although I prefer to use a permanent distance-recorder and also a route-chart in connection with my improved log, it is obvious that same are not essential to the operation of the log. Both the distance-recorder and the feeding mechanism for the chart may be of any well-known construction, many devices for this purpose being in common use.

It is obvious also that various changes may be made in the construction of the mechanism herein disclosed without involving more than the skill of the mechanic without departing from the spirit of my invention, provided the means covered in any one of the following claims be employed.

What I claim is—

1. In a ship's log, the combination with two pipes communicating with the water below the water-line of the vessel, a float in each of said pipes, and a counterweight attached to each float, of indicating mechanism comprising a frame or support, a screw-threaded shaft operatively connected with one of the floats, a nut upon said shaft, a ring longitudinally movable in the frame and engaged by said nut, a sleeve upon the shaft and rotatively connected with said nut, and connections between said sleeve and the other float substantially as described.

2. A ship's log, comprising means for admitting a column of water within a vessel so that the height of said column shall vary with the speed of the vessel, means for admitting a second column of water within the vessel so that the height of said column shall vary as the draft of the vessel, a screw-threaded shaft, a float on one of said columns operatively connected with said shaft to rotate the same as the height of the column changes, a disk upon said shaft, and a float on the other water column operatively connected with said disk, whereby the disk is moved lengthwise of the shaft proportionately to the relative variation of the heights of said water columns, substantially as described.

3. In a ship's log, the combination with two pipes communicating with the water below the water-line of the vessel and each containing a column of water, a float upon each of said water columns, a screw-threaded shaft operatively connected with one of said floats, a nut upon said shaft engaging with a ring longitudinally movable in the frame, a sleeve upon the shaft rotatively connected with the nut, said sleeve being operatively connected with the other float, substantially as described.

4. In a ship's log, the combination with two pipes each containing a column of water the height of one of said water columns being adapted to vary approximately as the square of the speed of the vessel, and the height of the other column being adapted to vary directly as the water-level of the vessel, of a movable disk threaded upon a shaft, means for rotating the shaft when the height of the water column varies, means for positively actuating the disk in the same direction as the shaft when the height of the level water column varies, and means upon said disk for recording the movements thereof, substantially as described.

5. In a ship's log, the combination with a water column variable in an approximately fixed ratio to the speed of the vessel and variable directly as the water-level of the vessel, of compensating gear adapted to change said variations of the water column into regular motion, and means for actuating said gear only when the water column varies in relation to the water-level of the vessel, substantially as described.

6. A ship's log comprising means for admitting a column of water within the vessel so that the height of said column shall vary with the speed of the vessel, a movable disk, mechanism actuated by said water column whereby the disk is operated, mechanism whereby changes in the water-level of the vessel are compensated for and said disk is operated only when the height of said water column changes in relation to the water-level of the vessel, compensating gears operatively connected with said disk and a speed-indicator adapted to be actuated by said gears and thereby to be moved equal distances for like increments of speed.

7. In a ship's log, the combination with a movable disk, of a water column variable in an approximately fixed ratio to the speed of the vessel, and means for actuating said disk when said water column varies in relation to the water-level of the vessel, substantially as described.

8. In a ship's log, the combination with a movable disk rotatably and longitudinally movable on a stationary shaft, means for actuating said disk a varying distance for corresponding changes in the speed of the vessel, of compensating spirals operatively connected with said disk adapted to change the varying motion thereof into regular motion, substantially as described.

9. In a ship's log, the combination with a movable disk rotatably and longitudinally movable on a stationary shaft, and means for moving said disk a varying distance for corresponding changes in the speed of the vessel, of compensating spirals, one of said spirals being operatively connected with said disk and the other spiral being connected with a speed-indicator, and adapted to move said indicator the same distance for each corresponding increase in the speed of the vessel, substantially as described.

10. In a ship's log, the combination with compensating spirals, one of said spirals being provided with a projection having an irregular-curved bearing-face, the other spiral being provided with a starter having a rounded end engaging the bearing-face of said projection, and means for rotating said spiral, substantially as described.

11. In a ship's log, the combination with compensating gear, and a rack reciprocated by said gear, of a pivoted arm, a movable connecting-rod operatively connected with distance-indicating mechanism, means for adjusting said connecting-rod on the arm, and means for rocking said arm at regular intervals, substantially as described.

12. In a ship's log, the combination with a clock, and a pivoted arm rocked by said clock, of a connecting-rod movably secured at one end upon said arm and operatively connected at its other end with distance-indicating mechanism, and means for adjusting said rod on the arm according to the speed of the vessel, substantially as described.

13. In a ship's log, the combination with a clock, and a pivoted arm rocked by said clock, of a rod movable on said arm and arranged to engage same opposite its pivotal point, said rod being operatively connected at one end with distance-indicating mechanism, and means for adjusting said rod on the arm according to the speed of the vessel, substantially as described.

14. In a ship's log, the combination of compensating gear, a clock, a pivoted arm rocked by said clock, distance-indicating mechanism, a connecting-rod movable on said arm operatively engaging said mechanism, and a reciprocating rack secured to said rod to adjust same on the arm, substantially as described.

15. In a ship's log, the combination with a clock and a pivoted arm rocked by said clock, of a connecting-rod secured at one end to a segment-lever and having its other end movably secured to said arm, a three-part lever operatively connected with said segment-lever, means for adjusting the throw of said three-part lever, a rotatable distance-indicator, a clutch, operatively connected with said three-part lever for actuating said distance-indicator, and means for adjusting said connecting-rod upon the arm, substantially as described.

16. In a ship's log, the combination with a segment-lever and means for actuating same at regular intervals, of a cam operatively connected with said lever and rotated thereby, a distance-recorder, and means engaging with said cam for actuating said recorder at each revolution of the cam, substantially as described.

In testimony whereof I sign this application, in the presence of two witnesses, this 31st day of March, 1900.

EZRA NICHOLSON.

Witnesses:
G. H. FOSTER,
C. I. HENDERSON.